(12) United States Patent
Laudel

(10) Patent No.: US 8,610,514 B2
(45) Date of Patent: Dec. 17, 2013

(54) FULL SPECTRUM MODULATOR FOR DIGITAL TELEVISION SIGNALS

(75) Inventor: Kennan Laudel, San Jose, CA (US)

(73) Assignee: RGB Networks, Inc., Sunnyvale, CA (US)

( * ) Notice: Subject to any disclaimer, the term of this patent is extended or adjusted under 35 U.S.C. 154(b) by 154 days.

(21) Appl. No.: 13/164,029

(22) Filed: Jun. 20, 2011

(65) Prior Publication Data

US 2012/0321010 A1 Dec. 20, 2012

(51) Int. Cl.
*H04L 27/20* (2006.01)

(52) U.S. Cl.
USPC ........... 332/103; 375/260; 375/261; 375/267; 348/724

(58) Field of Classification Search
USPC ............ 332/103; 375/260, 261, 267; 348/724
See application file for complete search history.

(56) References Cited

U.S. PATENT DOCUMENTS

| | | | | |
|---|---|---|---|---|
| 5,323,391 | A * | 6/1994 | Harrison | 370/210 |
| 5,907,585 | A * | 5/1999 | Suzuki et al. | 375/324 |
| 6,009,130 | A * | 12/1999 | Lurey et al. | 375/347 |
| 6,590,871 | B1 * | 7/2003 | Adachi | 370/307 |
| 6,996,188 | B2 * | 2/2006 | McCoy | 375/260 |
| 7,068,730 | B2 | 6/2006 | Monta | |
| 7,532,989 | B1 * | 5/2009 | Torosyan | 702/66 |

OTHER PUBLICATIONS

Gluth, R. "Regular FFT-Related Transform Kernels for DCT/DST-Based Polyphase Filter Banks", IEEE Proceedings ICASSP 1991, pp. 2205-2208.
Harris, et al. "Digital Receivers and Transmitters Using Polyphase Filter Banks for Wireless Communications", IEEE Transactions on Microwave Theory and Techniques, vol. 51, No. 4 Apr. 2003, 21 pages.
Salinger, et al. "Comcast Update: What is a CMAP?" Comcast Corporation, Feb. 1, 2010, <www.cable360.net/ct/sections/features/39723.html>, 10 pages.

* cited by examiner

*Primary Examiner* — Arnold Kinkead
*Assistant Examiner* — Richard Tan
(74) *Attorney, Agent, or Firm* — Lipsitz & McAllister, LLC

(57) ABSTRACT

A full spectrum modulator processes a plurality of CATV channels from separate paths. Each path has (i) a first filter for pulse shaping an input channel signal and upsampling a channel frequency thereof, (ii) an interpolator for interpolating the output of the first filter to a common sample rate, and (iii) a decimator for centering the output of the interpolator on a predetermined channel bandwidth. An IDFT processor receives channel signal outputs from the decimators. A polyphase filter bank receives IDFT processed parallel channel signals from the IDFT processor. A commutator converts the processed parallel channel signals from the polyphase filter bank to a single stream of data. A second filter upsamples the single stream of data to a fixed output sampling rate and low pass filters alias signals therefrom. Both standard and harmonically related carrier CATV channel frequency plans are accommodated.

23 Claims, 7 Drawing Sheets

FULL SPECTRUM MODULATOR FOR DIGITAL TELEVISION SIGNALS

The present invention relates to the communication of digital television signals and/or digital data signals (e.g., DOCSIS—Data Over Cable Service Interface Specification) over a cable television (CATV) distribution system or the like. More particularly, the invention provides a Digital Signal Processor (DSP) implementation of a full spectrum downstream modulator which is DOCSIS compliant and that fits in a single FPGA (Field Programmable Gate Array) or ASIC (Application Specific Integrated Circuit) and can be implemented using a single digital-to analog (D/A) converter.

BACKGROUND OF THE INVENTION

In recent years, the number of quadrature amplitude modulation (QAM) channels used for narrowcast digital television services has increased substantially. Most multiple system operators (MSOs) are providing more and more unicast QAM channels to support growth brought on by the success of video on demand (VOD) services. This has been driven, in large part, by an increase in offerings of high definition television services and content. Deployment of switched digital video (SDV) in order to provide an increased number of multicast content offerings is driving QAM channels even further. Additional QAM channels are also being deployed for MSOs cable modem termination system (CMTS) equipment.

While the number of QAM channels is growing, MSOs are reducing the size of the service groups they offer to make more efficient use of their cable television networks. Smaller service groups result in improved service quality. Moreover, reusing spectrum available in a network is advantageous in that it supports narrowcast service growth.

As a result of the above evolution in the CATV marketplace, more dense edge QAMs are required to reduce the cost of the equipment and the resulting environmental requirements in headends and distribution hubs. In order to help meet this need, a new equipment architecture option has been developed that enables the implementation of denser network architectures in a modular headend structure. Together with this, a new class of equipment is under development which is known as Converged Multiservice Access Platform (CMAP). CMAP implements the functions of the CMTS and edge QAM for all narrowcast and broadcast digital services. An introduction to CMAP can be found in the article *Comcast Update: What is a CMAP*, J. Salinger and J. Leddy, Comcast Corporation, Feb. 1, 2010.

In order to implement a CMAP system, it is necessary to provide a suitable modulator to add digital television data to a carrier waveform using QAM. The prior art contains various different architectures for accomplishing this, but they all have drawbacks. Some known solutions utilize an older, less efficient method in terms of multiply operations per channel or operations per sample. Such methods are best described by FIGS. 1 and 2. FIG. 1 is a sub-block diagram of the signal processing chain for a single channel in a first prior art modulator architecture. FIG. 2 illustrates how this single channel architecture is replicated in parallel and summed in order to implement an entire downstream spectrum.

As illustrated in FIG. 1, the modulator includes a symbol mapper 10, the output of which is provided to a first Square Root Raised Cosine Filter (SRRC) and interpolator 12 and a second SRRC and interpolator 14. The outputs of SRRC and interpolators 12 and 14 are provided to additional respective interpolators 16 and 20 which raise the output frequency of the signals to a range that is compatible with the sample rate of the downstream digital to analog converter (DAC) 28. The output of interpolator 16 is modulated with the sine function output from a digital quadrature oscillator 18 using mixer 22. The output of interpolator 20 is modulated with the cosine function output from the oscillator 18 using mixer 24. The outputs from the mixers 22, 24 are summed in adder 26, and the result is provided to a digital to analog converter (DAC) 28 in a conventional manner.

FIG. 2 is a prior art example of the parallelization of single channel sub-blocks. This apparatus, generally designated 30, replicates the single channel architecture of FIG. 1 in parallel and sums the results. The output from the DAC represents the entire downstream spectrum.

It is known (see, e.g., Harris, et al "Digital Receivers and Transmitters Using Polyphase Filter Banks for Wireless Communications," IEEE Transactions on Microwave Theory and Techniques, Vol. 51, No. 4, April 2003) that the type of architecture illustrated in FIGS. 1 and 2 is much less efficient than other known architectures, such as a Fast Fourier Transform (FFT) based Polyphase Channelizer approach. A Polyphase Channelizer is illustrated in FIG. 3, and has been demonstrated to be much more efficient (in terms of multiply operations per channel output sample).

As shown in FIG. 3, a plurality of channel streams 32a ... 32n are input to a 720 point Inverse Discrete Fourier Transform (IDFT) processor 34. The output of processor 34 is resampled by a polyphase resampling filter 36 and then processed by a commutator 38 to produce output to be converted to analog by a digital-to-analog converter (DAC). The functions of the polyphase resampling filter 36 are to resample the channels to 6 MHz centers, provide matched filtering, and to provide channelization filtering. Such an implementation has several limitations for a modular CMAP (M-CMAP) system, which include:

1. For the number of filter taps per phase specified in FIG. 3, it can not meet the specifications for Adjacent Channel, Wideband Noise, and Carrier Suppression. To meet these specifications would require more than doubling the number of filter taps per phase and prohibit an efficient, cost effective solution.
2. It can not meet the 5 ppm frequency accuracy specifications.
3. It can only modulate a single mode (256 or 64 QAM) across all channels, whereas the CMAP specification requires mixed mode (simultaneous 64 and 256 QAM) operation across all channels. Specifically, if there are N total channels, the specification requires M channels of 64 QAM and K channels of 256 QAM, where K+M=N.
4. The Polyphase Resampler requires 720×47 REAL multipliers, which overly constrains the resources and layout for any potential FPGA implementation.
5. Only the STD frequency plan is provided using this design, whereas the HRC frequency plan is also required for M-CMAP It would be advantageous to provide an M-CMAP implementation in which these limitations are overcome. More particularly, it would be advantageous to provide a DSP implementation of a full spectrum DOCSIS/CATV downstream modulator that uses a single FPGA or ASIC and a single D/A converter. Still further, it would be advantageous for such an implementation to make use of the FFT based polyphase channelizer approach and which implements an IDFT by utilizing a DCT (Direct Cosine Transform) and DST (Direct Sine Transform) computation that is highly efficient and is computed based on an N/4 sized FFT kernel, wherein after the DCT/DST, the signal is converted from complex to real in order to both utilize a single DAC and exploit the corresponding reduction in complexity.

The present invention provides methods and apparatus having the aforementioned and other advantages. Moreover, the unique combination of components/techniques disclosed herein provides various improvements over previously known structures and techniques.

SUMMARY OF THE INVENTION

A full spectrum modulator is provided which processes cable television signals or the like from a plurality of parallel channel processing paths. Each path has (i) a first filter for pulse shaping an input channel signal and upsampling a channel frequency thereof, (ii) an interpolator for interpolating the output of the first filter to a common sample rate, and (iii) a decimator for centering the output of the interpolator on a predetermined channel bandwidth that is related to the common sample rate. An Inverse Discrete Fourier Transform (IDFT) processor is coupled to receive channel signal outputs from the decimators of the plurality of parallel channel processing paths. A polyphase filter bank is coupled to receive IDFT processed parallel channel signals from the IDFT processor. A commutator converts the processed parallel channel signals from the polyphase filter bank to a single stream of data. A second filter upsamples the single stream of data to a fixed output sampling rate and low pass filters alias signals therefrom.

The modulator can be implemented for use with a standard cable television channel frequency plan. In such an implementation, the parallel channel processing paths can comprise a direct digital synthesizer (DDS) coupled between the interpolator and the decimator to add a carrier offset to signals input to the decimator from the interpolator. Such an implementation further includes a complex to real signal processor between the IDFT processor and the polyphase filter bank.

The IDFT processor can be, for example, a 360 point IDFT processor. The first filter is preferably a square root raised cosine (SRRC) filter with 1:2 upsampling. The interpolator can comprise a Farrow six tap cubic interpolator. The decimator can be a 2:1 decimator. The second filter can comprise an upsampling half band filter (HBF) with 1:2 upsampling.

A modulator can also be provided in accordance with the invention for use with a harmonically related carrier (HRC) cable television channel frequency plan. In this case, the IDFT processor is preceded by a cross bar switch adapted to flip the channel signal outputs from the decimators prior to input to the IDFT processor. In such an implementation, the second filter can consist of a high pass filter, a down converter following the high pass filter, and a low pass filter following the down converter. More specifically, the second filter can comprise a high pass half band filter (HBF), a direct digital synthesizer (DDS) down converter following the high pass filter, and a low pass half band filter following the down converter.

Like the standard cable television channel frequency plan implementation, in the HRC implementation the IDFT processor can be a 360 point IDFT processor and the first filter can be a square root raised cosine (SRRC) filter with 1:2 upsampling. The interpolator can comprise, e.g., a Farrow six tap cubic interpolator, and the decimator can be a 2:1 decimator. The second filter can comprise a high pass filter, a down converter following the high pass filter, and a low pass filter following the down converter. It should be appreciated that other types of interpolators, decimators and filter arrangements can alternatively be used. Choices of other implementations will depend, for example, upon the allocation of performance margins across all of the blocks in the modulator.

A method is provided for modulating a plurality of cable television channel signals each having a channel frequency. In accordance with the method, each of the channel signals is pulse shaped and then the channel frequency of each pulse shaped signal is upsampled. The pulse shaped, upsampled signals are interpolated to a common sample rate. The interpolated signals are then centered to a predetermined channel bandwidth that is related to the common sample rate. An Inverse Discrete Fourier Transform (IDFT) is performed on each of the channel signals. The channel signals are polyphase filtered after the IDFT. The filtered channel signals from the polyphase filter bank are then converted into a single stream of data, which is upsampled to a fixed output sampling rate. The upsampled single stream of data is low pass filtered to remove alias signals therefrom.

In a first implementation for use with a standard cable television channel frequency plan, the method of the invention adds a carrier offset to the interpolated signals provided by the interpolating step. The signals are converted from complex to real between the IDFT and polyphase filtering steps.

A method is also provided for use with a harmonically related carrier cable television channel frequency plan. In such an implementation, the frequency spectrums of the channel signals are flipped between the centering and IDFT steps. The single stream of data is high pass filtered during the second upsampling step, and then the high pass filtered single stream of data is down converted prior to the low pass filtering step.

DETAILED DESCRIPTION OF THE INVENTION

Figure 4:
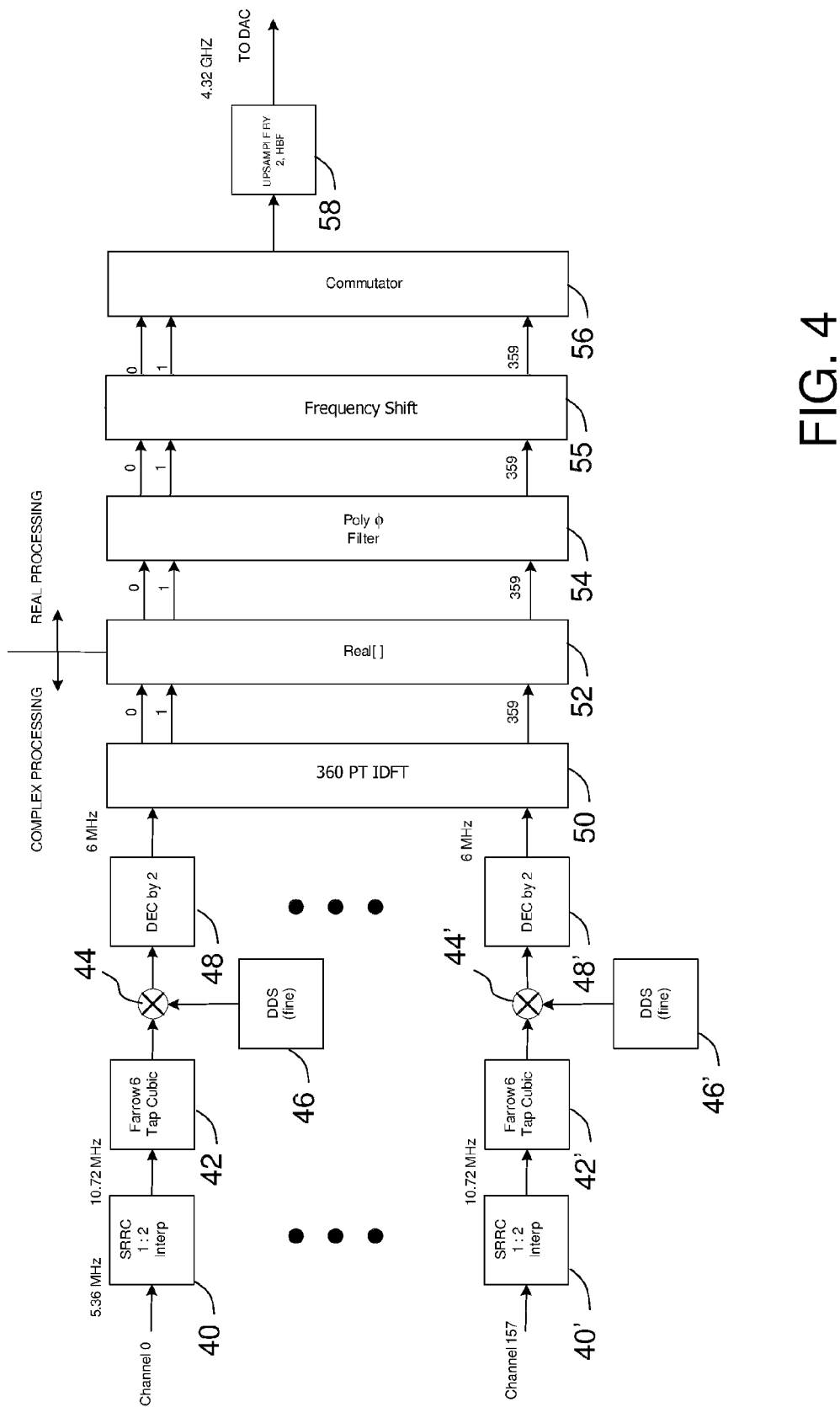
FIG. 4 is a block diagram of a standard frequency plan modulator in accordance with the present invention.

A first implementation of the present invention is illustrated in FIG. 4, which is a block diagram of a full spectrum downstream television modulator that can fit within a single FPGA or ASIC and can utilize a single D/A converter. Proceeding from left to right in FIG. 4, complex QAM symbols are injected as inputs from a symbol mapper (not shown) to a Square Root Raised Cosine Filter (SRRC) and 1:2 interpolator 40 which simultaneously up-samples the channel frequency by two (e.g., from 5.36 MHz to 10.72 MHz) and pulse shapes the signal. There are potentially 158 independent QAM channels which collectively form the entire 1 GHz DOCSIS/CATV downstream signal. Each of these channels can be processed independently by respective components (e.g., SRRC 1:2 interpolators 40', Farrow cubic interpolators 42', mixers 44', direct digital synthesizers 46' and decimators 48') corresponding to components 40, 42, 44, 46 and 48 described in detail herein.

The input QAM symbols can be either 64 QAM symbols at an input symbol rate of, e.g., 5.056941 Msym/sec or 256 QAM symbols at an input symbol rate of, e.g., 5.360537 Msym/sec. For 64 QAM the SRRC shaping is done with an alpha of 0.18, while for 256 QAM the SRRC shaping is done with an alpha of 0.12. The next block in the chain, the Farrow six tap cubic interpolator 42, interpolates both 64 and 256 QAM signals to a common 12 MHz sample rate. This is done in preparation for the Polyphase Channelizer, which will process all of the channels independently of symbol rate on 6 MHz channel centers (the specification requirement for channel spacing).

The next block is a fine DDS (Direct Digital Synthesizer) 46 which adds a small carrier offset in order to accurately comply to the STD frequency plan. For the STD frequency plan, these frequency offsets are either 0, 12.5 or 25 kHz depending on the channel. These offsets are well known in the art and can be found, for example, in the CEA-542-C Cable Television Channel Identification Plan Specification, February 2009. The M-CMAP specification requires that these frequency offsets be met to within 5 ppm. Thus, the DDS 46 must be highly accurate (i.e., a DDS having a "fine" resolution).

The next block in the modulator of FIG. 4 is a simple decimate by 2 function 48, which discards every other sample so that the Polyphase Channelizer works on 6 MHz centers. The input to function 48 is the product of the outputs of the Farrow six tap cubic interpolator 42 and the DDS 46, which is provided by a multiplier (mixer) 44.

A 360 point IDFT 50 is employed which efficiently up-converts each of the individual channels (after the respective decimate functions 48, 48') to it's proper center frequency while also up-sampling the collective channels to a 2.16 GHz sample rate. Note that a 360 point IDFT requires 360 input channels. For the target application of the invention, there are only X~<=158 utilized channels. In this case, the remaining unused 360−X=Y input channels of the IDFT are set to zero. It will be appreciated by those skilled in the art that many efficient IDFT implementations are currently known and that other such implementations will likely be developed in the future. The present invention is therefore not limited to any particular implementation of IDFT 50. One such implementation that can be used makes use of the technique described by Gluth (*Regular FFT-Related Transform Kernels for DCT/DST-Based Polyphase Filter Banks*, International Conference on Acoustics, Speech, and Signal Processing, 1991) which utilizes a DCT and DST (Direct Cosine Transform and Direct Sine Transform) computation that is highly efficient and is computed based on an N/4 sized FFT kernel.

After the signal has been processed by IDFT 50, it is converted from complex to real by processor 52 in order to both utilize a single DAC and exploit the corresponding reduction in complexity. Next, a Polyphase Filter Bank 54 is employed to provide channelization filtering for each of the up to 158 channels. A frequency shifter 55 provides a frequency shift of half the individual channel width (ex: 3 MHz) to realize the STD channel centering. A commutator 56 then converts the parallel channels to a single stream of data at, e.g., a 2.16 GHz sample rate. Finally, an upsampling Half Band Filter (HBF) 58 is employed to both upsample the output to the proper output sampling rate of, e.g., 4.32 GHz and low pass filter the alias signals above, e.g., 1.08 GHz.

It should be noted that the present invention meets the M-CMAP requirements of:
 a) Channelization filter stop band specs (Adjacent Channel, Wideband Noise, and Carrier Suppression),
 b) Mixed 64 and 256 QAM mode,
 c) Frequency accuracy to 5 ppm,
 d) a path to HRC frequency plan, and
 e) flexibility of multiply/DSP slice resource usage.

Figure 6:
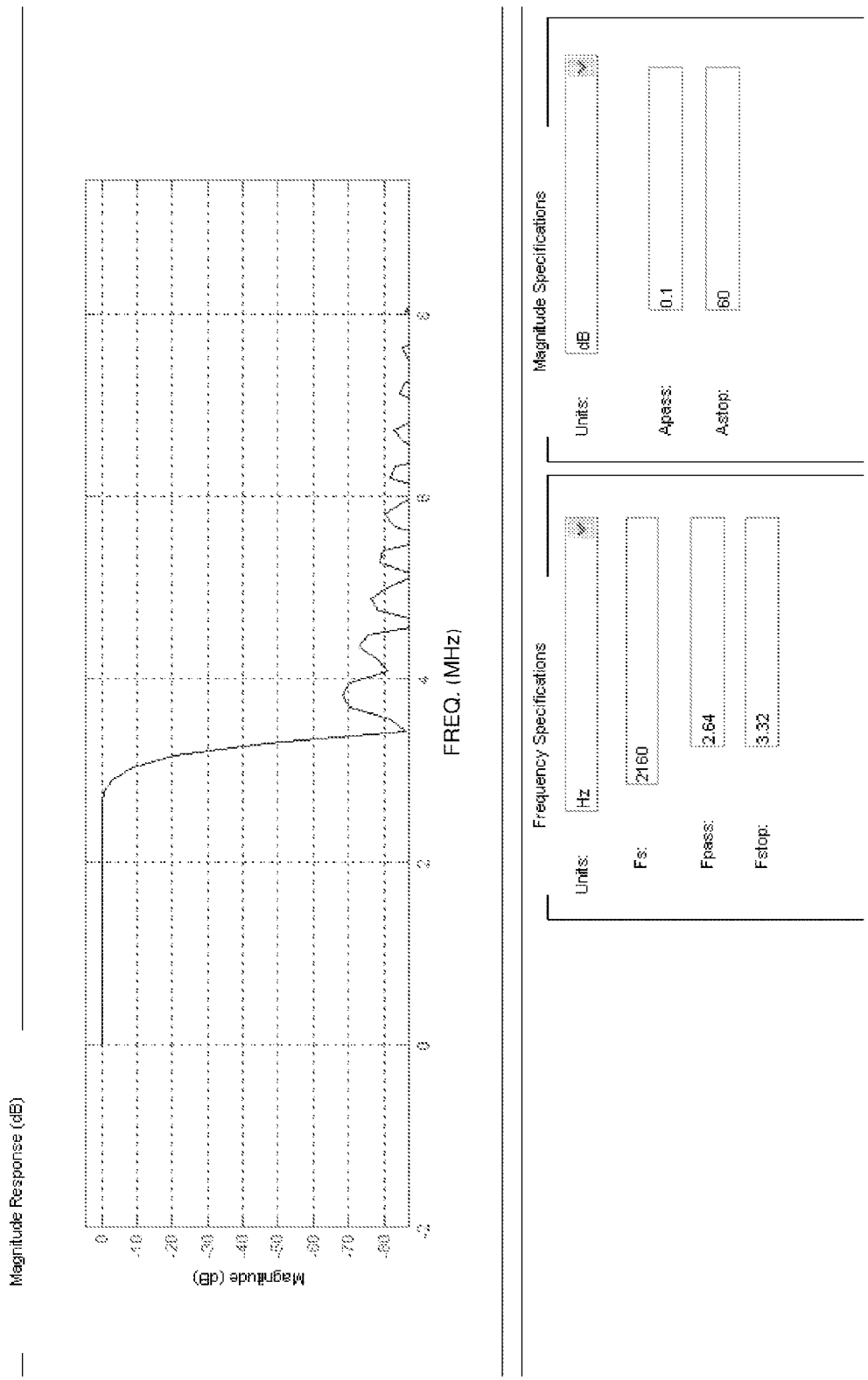
FIG. 6 is a screen shot of a filter design showing an implementation of a channelization filter in accordance with the present invention.

FIG. 6 is a screenshot 80 illustrating an example implementation of a channelization filter and the filter response in accordance with the invention. This implementation has been shown in simulation to meet (with good margin) the Adjacent Channel, Wideband Noise, and Carrier Suppression specifications for M-CMAP. Such performance is not achieved with prior art designs such as the implementation illustrated in FIG. 3. The improved performance provided by the present invention results, at least in part, from the separation of the pulse shaping function from the channelization function as taught herein.

Figure 1:
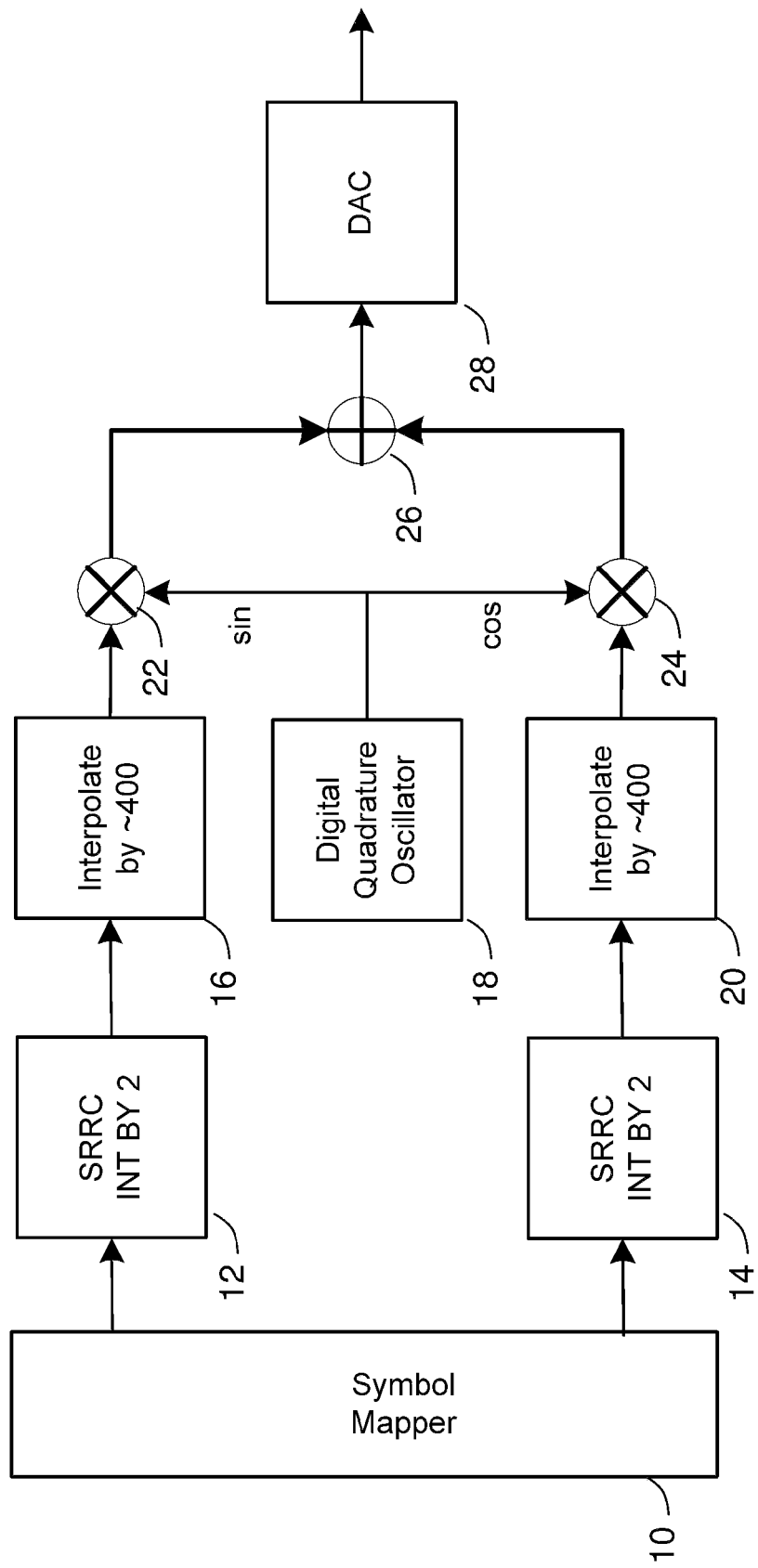
FIG. 1 is a block diagram illustrating signal processing apparatus for a single channel modulator in accordance with the prior art.
Figure 2:
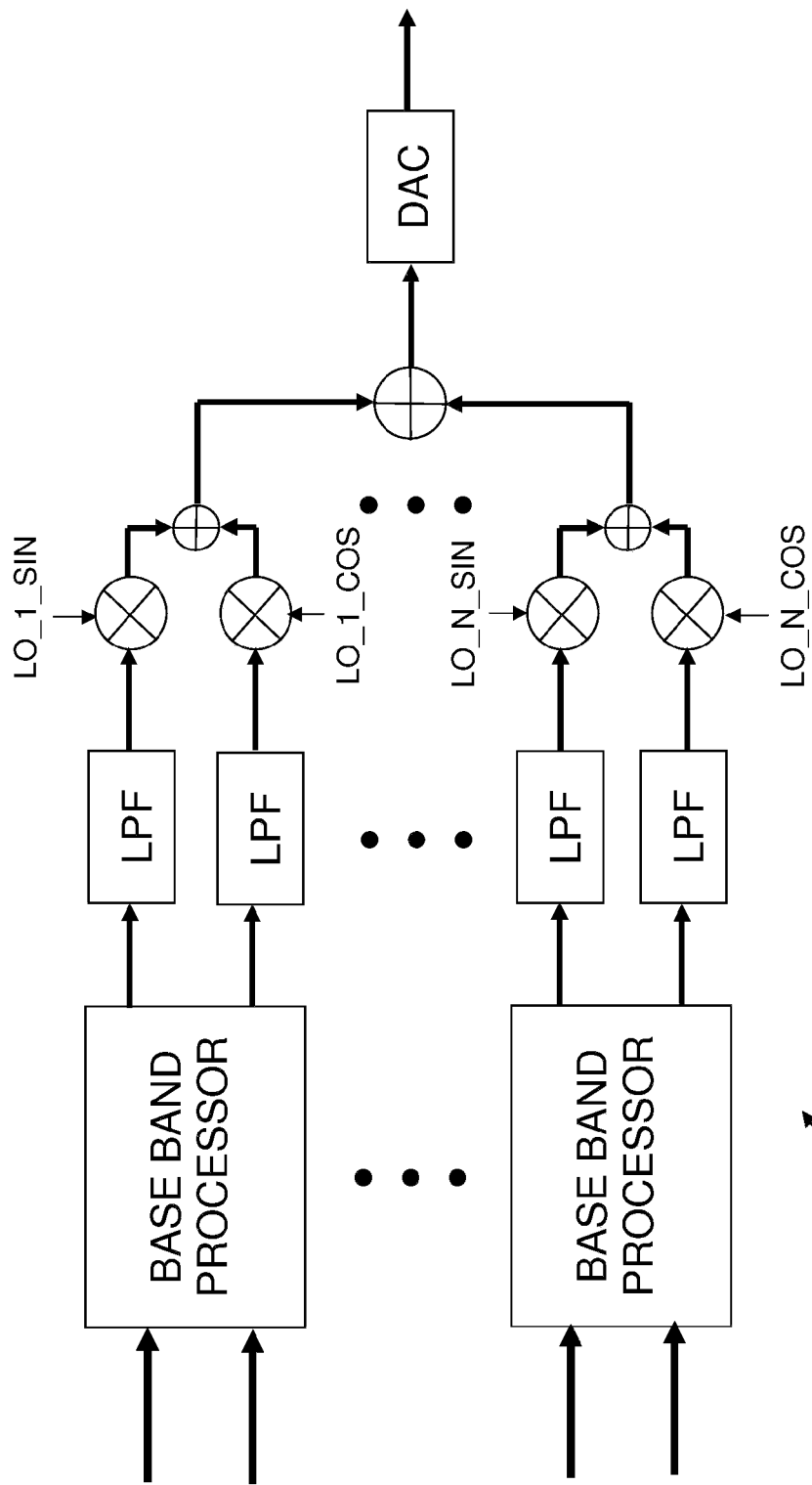
FIG. 2 is a block diagram illustrating how the single channel architecture of FIG. 1 can be replicated in parallel and summed in order to implement an entire downstream spectrum.

It is further noted that the architecture of the present invention reduces the required REAL multiplies per channel output sample by ~87%. For an FPGA implementation, this means that the designer has more flexibility in choosing if and where to use DSP slices (i.e. the designer can implement fixed coefficient multiplies by shift and add operations, as desired). Note that the DSP slices were required in the legacy designs illustrated in FIGS. 1-3 (all REAL multiplies required) and were 100% utilized. This forced the designer into a corner, requiring larger FPGA devices with more DSP slices, hand routing and 'locked down' DSP slice coordinates in order to meet timing for different place and route cycles. This disadvantage of the prior art is overcome by the present invention.

For an ASIC implementation in accordance with the present invention, the use of fixed coefficients enables the gate count to be reduced substantially (shift and adds vs. REAL multiplies). Again, this represents a significant advantage of the present invention over the prior art.

Moreover, the present invention achieves performance advantages over the prior art by combining (i) a 360 point IDFT, (ii) Post IDFT processing using REAL data (not COMPLEX), (iii) a Polyphase Channelization Filter, and (iv) a Commutator used collectively to implement the FFT based Polyphase Channelizer. In addition, the present invention improves on the prior art by using the up-sampling Half Band Filter to exploit the relaxed DOCSIS Downstream RF Interface Specification (CM-SP-DRFI-I10-100611) requirements for out-of-band (OOB) noise (−38 dBc vs. −50 dBc), thus reducing the overall modulator size and the Polyphase Channelizer by one half. Additional benefits are achieved with the present design by using the baseband DDS blocks to implement the STD frequency plan carrier offsets (0, 12.5, and 25 kHz) to within 5 ppm. Still further, the present invention splits the functionality of the pulse shaping and channelization filters to achieve DOCSIS Downstream RF Interface Specification (DRFI) performance (Adjacent Channel, Carrier Suppression, etc), and uses spectrum reversal, a High Pass Filter and a simple REAL down-converter to enhance the HRC capability of the modulator.

Figure 5:
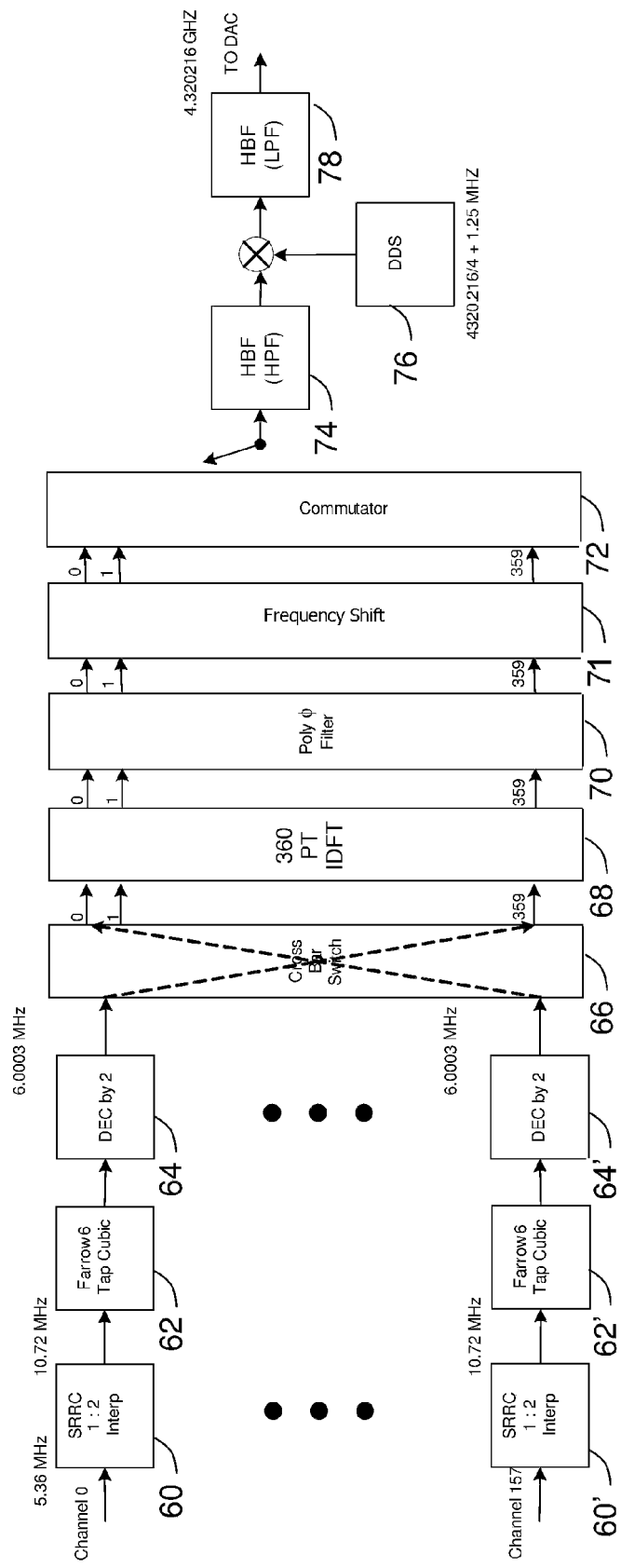
FIG. 5 is a block diagram of a harmonically related carrier (HRC) frequency plan modulator in accordance with the present invention.

FIG. 5 is a block diagram showing a modulator in accordance with the invention for use with the HRC frequency plan. It consists of an SRRC 1:2 interpolator 60, Farrow six tap cubic interpolator 62 and decimator 64. Each of these components is functionally equivalent to the respective components 40, 42 and 48 of FIG. 4 described above. Comparable components 60', 62' and 64' are provided for each channel.

The HRC embodiment of FIG. 5 eliminates the fine DDSs 46, 46' and the mixers 44, 44' of FIG. 4, and adds various other components. In particular, a Cross Bar switch 66 is provided after the decimators 64, 64' which flips the aliased spectrum at 2.16 GHz, and a post IDFT High Pass Filter 74 is provided to capture this aliased spectrum. The captured alias is then down-converted to baseband via a coarse DDS 76. The resultant spectrum is then filtered by a low pass filter 78 which provides the modulator output. 360 point IDFT 68, polyphase filter 70, frequency shifter 71 and commutator 72 provide the same functions as the corresponding components 50, 54, 55 and 56 of FIG. 4.

Figure 7:
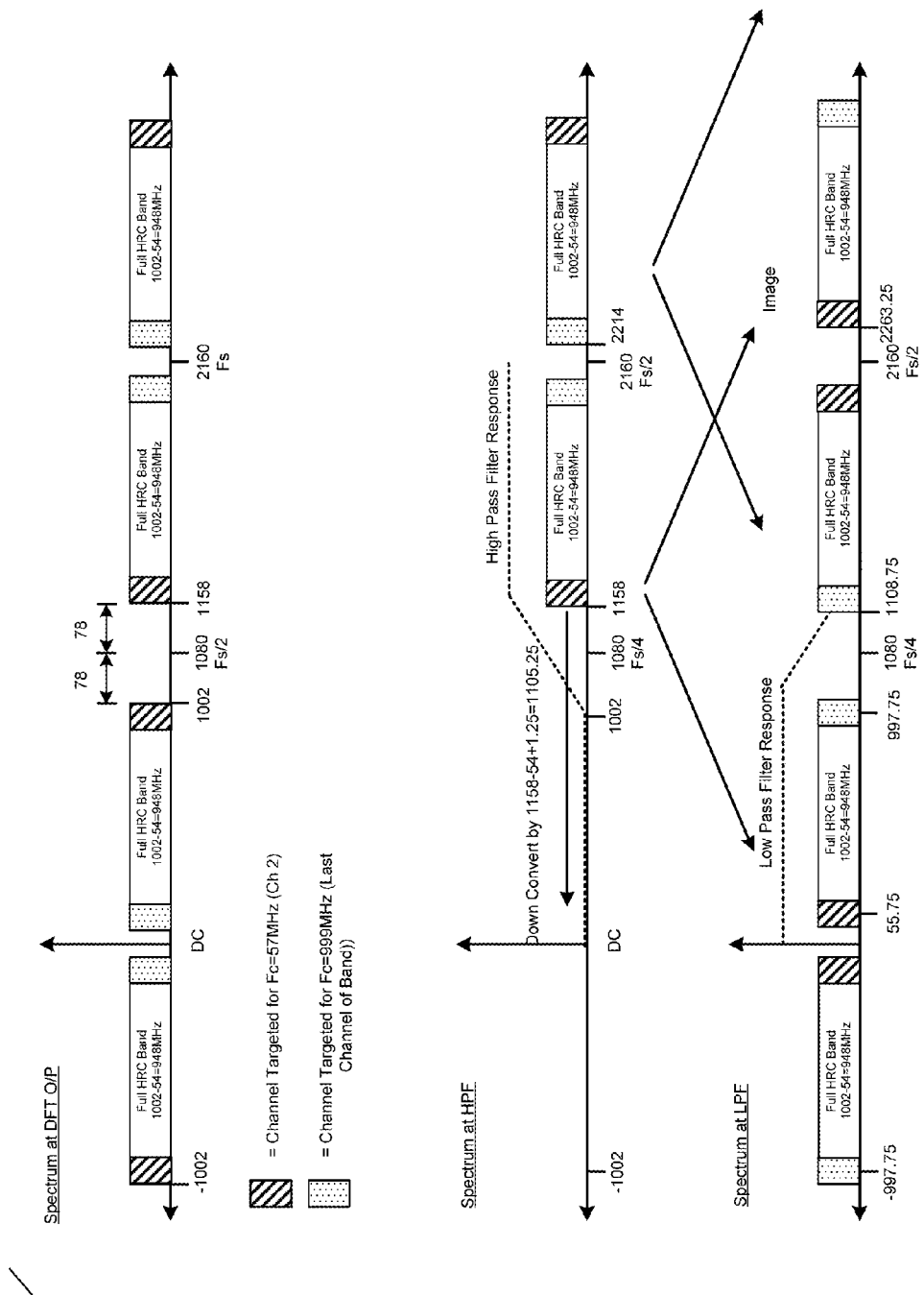
FIG. 7 illustrates the spectrum output from the modulator of FIG. 5 in the frequency domain.

FIG. 7 illustrates the spectrum (generally designated 82) output from the modulator of FIG. 5 in the frequency domain. Note that the DAC PLL clock output needs to be re-programmed, e.g., from 4.32 GHz (STD) to 4.320216 GHz (HRC) when implementing the HRC embodiment. This is because the HRC frequency plan calls for a channel spacing of 6.0003 MHz (360×2×6.003 MHz=4.320216 GHz). Note also that 6.0003 MHz is the new sample rate at the output of decimators 64, 64'

It should now be appreciated that the present invention provides a DSP implementation of a full spectrum DOCSIS/CATV downstream modulator that fits in a single FPGA or ASIC and requires only a single D/A converter. In accordance with the invention, matched/pulse shaping filtering and resampling functions are provided before the IDFT engine as illustrated in FIG. 4 (standard frequency plan) and FIG. 5 (harmonically related carrier frequency plan). Such an implementation, which separates the pulse shaping filter from the channelization filter enables the modulator to meet the required specifications for adjacent channel, wideband noise and carrier suppression.

For the standard frequency plan implementation, the invention also places the DDS between the Farrow Interpolator and the IDFT engine, as shown in FIG. 4. This allows the standard frequency plan accuracy to meet the <=5 ppm specification. This offset is not enough to cause any significant degradation at baseband, so two DDS engines (12.5 kHz, 25 kHz) can service all of the channels (no need for a DDS engine per channel) and meet the requirements without requiring the modulator to have complete frequency agility.

The reduction of the IDFT engine from, e.g., 720 points to 360 points, together with the addition of half band filtering (HBF) as shown in FIGS. 4 and 5 reduces dependency on DSP slices, allows the use of fixed value or constant coefficients, and allows the use of simple shift and adds for multiply (MULT) operations. These features also exploit HBF symmetry and zero coefficients (half of the coefficients are zero). Further, the recent DRFI (CM-SP-DRFI-I10-100611) comparatively lenient out of band noise specification of >1 GHz is exploited using the HBF, and this relaxed requirement is shared with the IDFT engine.

Modulators in accordance with the invention also provide flexibility regarding dynamic versus static multiplier coefficients. Fixed coefficients are used wherever possible. And, as indicated in FIG. 5, an HRC implementation is achieved by adding low pass filtering and DDS on the output.

Figure 3:
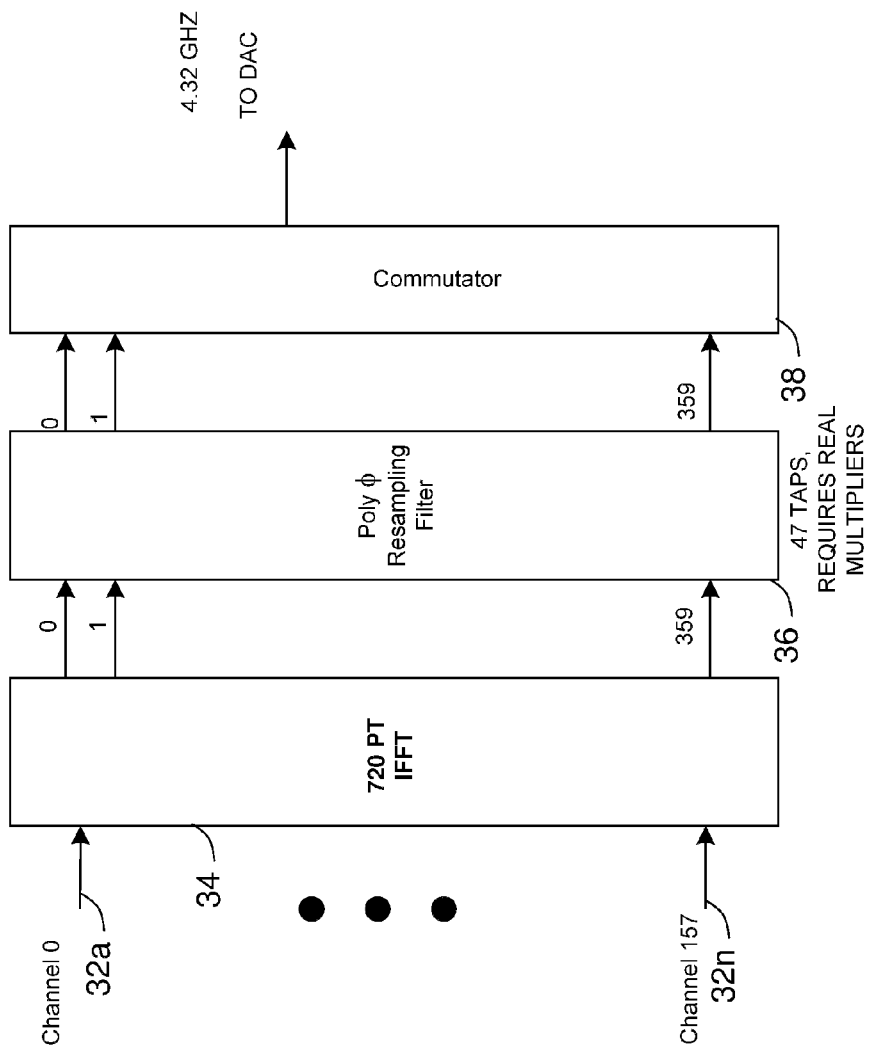
FIG. 3 is a block diagram of a polyphase channelizer modulator implementation in accordance with the prior art.

The inventive modulator is also advantageous in that it provides about an 87% reduction in required REAL MULTS/Channel O/P sample relative to the architecture of FIG. 3. Fixed coefficients are implemented as shifts and adds, and more design flexibility is provided in choosing if and where to use FPGA DSP slices. 64 and 256 QAM can also be mixed, which is an advantage over prior art implementations, such as shown in FIG. 3, that could only process 256 QAM signals.

Although the invention has been described in accordance with particular example implementations, those skilled in the art will appreciate that various other embodiments, variations and modifications can be provided using the teachings of the invention, all of which are intended to be included within the scope of the following claims.

What is claimed is:

1. A full spectrum modulator comprising:
a plurality of parallel channel processing paths, each path having (i) a first filter for pulse shaping an input channel signal and upsampling a channel frequency thereof, (ii) an interpolator for interpolating the output of said first filter to a common sample rate, and (iii) a decimator for centering the output of said interpolator on a predetermined channel bandwidth that is related to said sample rate;
said parallel channel processing paths comprising a direct digital synthesizer (DDS) coupled between said interpolator and said decimator to add a carrier offset to signals input to said decimator from said interpolator;
an Inverse Discrete Fourier Transform (IDFT) processor coupled to receive channel signal outputs from the decimators of said plurality of parallel channel processing paths;
a complex to real signal processor coupled to receive IDFT processed parallel channel signals from said IDFT processor and convert complex signals to real signals to obtain converted parallel channel signals;
a polyphase filter bank coupled to receive the converted parallel channel signals from said signal processor;
a commutator for converting the converted parallel channel signals from said polyphase filter bank to a single stream of data; and
a second filter for upsampling the single stream of data to a fixed output sampling rate and for low pass filtering alias signals therein.

2. A modulator in accordance with claim 1, wherein said modulator is for use with a standard cable television channel frequency plan.

3. A modulator in accordance with claim 1, wherein said IDFT processor is a 360 point IDFT processor.

4. A modulator in accordance with claim 3, wherein said first filter is a square root raised cosine (SRRC) filter with 1:2 upsampling.

5. A modulator in accordance with claim 4, wherein said interpolator is a Farrow six tap cubic interpolator.

6. A modulator in accordance with claim 5, wherein said decimator is a 2:1 decimator.

7. A modulator in accordance with claim 6, wherein said second filter is an upsampling half band filter (HBF) with 1:2 upsampling.

8. A modulator in accordance with claim 1, further comprising:
a frequency shifter between the polyphase filter bank and the commutator providing a half channel frequency shift for centering of the channel signals.

9. A modulator for use with a harmonically related carrier cable television channel frequency plan, comprising:
a plurality of parallel channel processing paths, each path having (i) a first filter for pulse shaping an input channel signal and upsampling a channel frequency thereof, (ii) an interpolator for interpolating the output of said first filter to a common sample rate, and (iii) a decimator for centering the output of said interpolator on a predetermined channel bandwidth that is related to said sample rate;

an Inverse Discrete Fourier Transform (IDFT) processor coupled to receive channel signal outputs from the decimators of said plurality of parallel channel processing paths;

a polyphase filter bank coupled to receive IDFT processed parallel channel signals from said IDFT processor;

a commutator for converting the processed parallel channel signals from said polyphase filter bank to a single stream of data;

a second filter for upsampling the single stream of data to a fixed output sampling rate and for low pass filtering alias signals therein;

wherein said IDFT processor is preceded by a cross bar switch adapted to flip the frequency spectrum of the channel signal outputs from the decimators prior to input to the IDFT processor.

10. A modulator in accordance with claim 9, wherein said second filter comprises a high pass filter, a down converter following said high pass filter, and a low pass filter following said down converter.

11. A modulator in accordance with claim 10, wherein said second filter comprises a high pass half band filter (HPF), a direct digital synthesizer (DDS) down converter following said high pass filter, and a low pass half band filter following said down converter.

12. A modulator in accordance with claim 9, wherein said IDFT processor is a 360 point IDFT processor.

13. A modulator in accordance with claim 9, wherein said first filter is a square root raised cosine (SRRC) filter with 1:2 upsampling.

14. A modulator in accordance with claim 13, wherein said interpolator is a Farrow six tap cubic interpolator.

15. A modulator in accordance with claim 14, wherein said decimator is a 2:1 decimator.

16. A modulator in accordance with claim 15, wherein said second filter comprises a high pass filter, a down converter following said high pass filter, and a low pass filter following said down converter.

17. A modulator in accordance with claim 16, wherein said IDFT processor is a 360 point IDFT processor.

18. A modulator in accordance with claim 9, further comprising:

a frequency shifter between the polyphase filter bank and the commutator providing a half channel frequency shift for centering of the channel signals.

19. A method for modulating a plurality of cable television channel signals each having a channel frequency, comprising:

pulse shaping each of said channel signals;

upsampling the channel frequency of each pulse shaped signal;

interpolating the pulse shaped, upsampled signals to a common sample rate;

adding a carrier offset to the interpolated signals provided by said interpolating step;

centering the interpolated signals to a predetermined channel bandwidth that is related to the common sample rate;

performing an Inverse Discrete Fourier Transform (IDFT) on each of said channel signals;

converting the signals from complex to real after said IDFT;

polyphase filtering the channel signals after said converting;

converting the filtered channel signals from said polyphase filter bank into a single stream of data;

upsampling the single stream of data to a fixed output sampling rate; and low pass filtering the upsampled single stream of data to remove alias signals therefrom.

20. A method in accordance with claim 19, wherein the method is for use with a standard cable television channel frequency plan.

21. A method in accordance with claim 19, further comprising:

frequency shifting the channel signals by one half of a channel frequency after the polyphase filtering for centering of the channel signals.

22. A method for modulating a plurality of cable television channel signals each having a channel frequency for use with a harmonically related carrier cable television channel frequency plan, comprising:

pulse shaping each of said channel signals;

upsampling the channel frequency of each pulse shaped signal;

interpolating the pulse shaped, upsampled signals to a common sample rate;

centering the interpolated signals to a predetermined channel bandwidth that is related to the common sample rate;

performing an Inverse Discrete Fourier Transform (IDFT) on each of said channel signals;

polyphase filtering the channel signals after said IDFT;

converting the filtered channel signals from said polyphase filter bank into a single stream of data;

upsampling the single stream of data to a fixed output sampling rate;

low pass filtering the upsampled single stream of data to remove alias signals therefrom;

flipping the channel signals between said centering and IDFT steps;

high pass filtering the single stream of data during the second upsampling step; and down converting the high pass filtered single stream of data prior to said low pass filtering step.

23. A method in accordance with claim 22, further comprising:

frequency shifting the channel signals by one half of a channel frequency after the polyphase filtering for centering of the channel signals.

* * * * *